United States Patent [19]
Hirsch

[11] Patent Number: 5,165,458
[45] Date of Patent: Nov. 24, 1992

[54] WOODWORKING MACHINE FOR END MACHINING OF FRAME TIMBERS

[76] Inventor: Wilhelm Hirsch, Gerhart-Hauptmann-Strasse 47, D-7417 Pfullingen, Fed. Rep. of Germany

[21] Appl. No.: 763,380

[22] Filed: Sep. 20, 1991

[30] Foreign Application Priority Data

Oct. 31, 1990 [DE] Fed. Rep. of Germany ....... 4035512

[51] Int. Cl.$^5$ ............... B27M 1/08; B27C 9/00
[52] U.S. Cl. .................... 144/3 R; 144/84; 144/91; 144/203; 144/367; 144/368; 144/253 R
[58] Field of Search .......... 144/39, 3 R, 84, 91, 144/198 R, 198 A, 201, 203, 367, 368, 369, 253 R

[56] References Cited

U.S. PATENT DOCUMENTS

| 3,288,181 | 11/1966 | Fellman | 144/3 R |
| 4,450,881 | 5/1984 | Buttner | 144/84 |
| 4,484,607 | 11/1984 | Gemmani | 144/84 |
| 4,903,743 | 2/1990 | Zweig | 144/3 R |

FOREIGN PATENT DOCUMENTS

2161358 9/1972 Fed. Rep. of Germany .
8907800 1/1990 Fed. Rep. of Germany .
3903160 8/1990 Fed. Rep. of Germany .

Primary Examiner—W. Donald Bray
Attorney, Agent, or Firm—Flynn, Thiel, Boutell & Tanis

[57] ABSTRACT

A woodworking machine for end machining for frame timbers comprises a work table (2), a saw unit (7) with a horizontal saw axis and a moulding unit (8) with vertical moulding spindle. These two units (7, 8) are movable relative to the work table (2) in the direction (S) of the saw plane. A graduated fence (12) is provided, pivotal relative to the work table (2) and adapted to be fixed, with a length stop (22) adjustable by means of a millimeter scale (23). A pivotal bearing (15) containing the vertical pivot axis (13) of the graduated fence (12) is arranged on a support frame (14) connected to the work table (2) above the working region of the circular saw blade (9) and the moulding cutters (11). This pivot axis (13) is arranged in the vicinity of the line of intersection of the saw plane (S) and the vertical plane running through a vertical fence surface (12a) of the graduated fence (12). A vertical frame (21) with a cantilevered arm (20) is provided on the graduated fence (12), with its free end connected to the pivot axis (13). The longitudinal side (2a) of the table facing the saw plane (S) and extending parallel thereto extends closely up to the saw plane (S).

9 Claims, 6 Drawing Sheets

WOODWORKING MACHINE FOR END MACHINING OF FRAME TIMBERS

FIELD OF THE INVENTION

This invention relates to a woodworking machine for end machining of frame timbers, especially for window and door frames, with a work table, a saw unit with a circular saw blade rotating about a horizontal axis and a moulding unit with vertical moulding spindle and a plurality of cutters arranged thereon, wherein the two units are movable relative to the work table in the direction of the saw plane, and there is provided a graduated fence pivotal on the work table about a vertical pivot axis and adapted to be fixed in the set angular position, with a vertical fence surface for a longitudinal side of the frame timber and a length stop adjustable by means of a millimeter scale, and wherein the pivot axis is arranged at or near the line of intersection of the saw plane and the vertical plane running through the vertical fence surface.

BACKGROUND OF THE INVENTION

Before the frame timbers can be assembled into window or door frames, they must be machined accurately to length and their ends also provided with tongues and grooves or so-called mini-joint. Woodworking machines of the kind initially referred to serve mainly for end machining of frame timbers, in which the adjoining frame timbers include an angle other than 90°, as is the case with slanted windows or arch windows assembled from segments. The particular difficulty in end machining frame timbers for slanted windows and segmented arches consists in that the frame timber in question shall actually have the desired length after machining the two ends. In woodworking machines it is customary to get the desired length by adjusting a length stop with the aid of a millimeter scale. These simple length stops do not work however when the work table is pivoted about an axis removed from the saw plane, since the end of the timber to be machined is removed to a greater or lesser extent from the saw plane on pivoting the work table. For this reason the pivot axis is arranged at the line of intersection of the saw plane and the vertical plane running through the vertical fence surface in the woodworking machine of the kind initially refereed to (DE 2 161 385 A1).

In one such known woodworking machine (DE 2 161 385 A1) the saw unit and the moulding unit are arranged stationary on the machine frame. There is provided a work table movable relative to the machine frame. The graduated fence is supported and pivotally mounted on this work table. To this end two curved guide rails are connected fast to the work table, each having a curved guide slot. The graduated fence has two tongues, in each of which is arranged a bolt with a wing nut. Each of these two bolts engages in one of the two guide slots. By means of the bolts and the wing nuts the graduated fence can be fixed in the currently set angular position relative to the guide rails and hence relative to the work table. In order that the bolts can be moved in the curved guide slots after the wing nuts have been released, a certain amount of play is necessary. However, even the slightest amount of play affects the accuracy since the pivot axis of the graduated fence determined by the curved guide slots can be displaced simply as a result of this play. The length set by the length stop and also the set angle are then no longer correct. This has the result that both the mitre angle and the length are no longer correct in the frame timber as finally machined. On assembling a plurality of frame timbers into a circular arch the errors accumulate. Furthermore, in the known woodworking machine the graduated fence is formed as a U-shaped fence bar in which the two U-arms are disposed horizontally and the U-web forms the vertical fence surface. The two U-arms serve alternately to support the frame timber, which is pressed down by two clamping cylinders each arranged on the opposite U-arms. Since the two U-arms approach the saw plane from their datum position extending perpendicular to the saw plane and would thus get into the working region of the saw and also the moulding unit, the U-arms must have a larger spacing from the saw plane. This again has the disadvantage that the frame timber is insufficiently supported at the end to be machined. Moreover the known woodworking machine requires a relatively large amount of space for its installation, since there does not only have to be enough space for the movement of the work table but also for the frame timber usually projecting a great length off the work table, whereby this space requirement is increased so that the frame timber can be arranged in various angular positions relative to the saw plane. Moreover there is an increased risk of accident from the frame timber projecting far beyond the work table and which is moved together with the work table during the end machining, if the whole possible working space is not fenced off.

In a similarly formed known woodworking machine (DE 3 717 731 A1) a roller carriage, which carries the actual work table, is movable relative to the machine frame. The work table has a graduated fence for the frame timber fixedly connected thereto. The pivot axis of the work table should lie in the plane in which the side surface of the circular saw blade facing the frame timber moves. Since the pivot axis would thus be located in the working range of the circular saw, the facing surfaces of the work table and the roller carriage are provided with interengaging parts of an arcuately formed curved guide. The guide has a radius which corresponds to the distance of the guide from the pivot axis. This kind of pivotal mounting of the work table is however relatively expensive to make, since both the work table and the roller carriage have to be provided with interengaging arcuately formed guides, which have to be machined very accurately; moreover cylindrical rollers have to be provided between the guides in order to reduce the friction. Also this known woodworking machine needs a relatively large space for its installation, like the initially described woodworking machine. Since the work table always approaches the saw plane with its sides on pivoting out of its datum position extending perpendicular to the saw plane and would thus get into the working region of the circular saw, the work table must have a larger spacing from the saw plane. This has the disadvantage that the frame timber is inadequately supported at the end to be machined or short frame timbers can even not be machined.

In another known woodworking machine for end machining frame timbers (DE 8 907 800 U1) a graduated fence is mounted on a work table pivotal about a vertical pivot axis. The pivot axis of the graduated fence is here given a greater spacing from the saw plane. A length stop is slidable and adapted to be fixed in position on the graduated fence. There are three different electrical transducers, of which one determines the angle of rotation of the pivot axis, a second the distance of the stop from the pivot axis and a third the distance between a predetermined datum point on the work table and the tool. The measuring signals of these three transducers are fed to an evaluating and processing unit, in which calibration signals are so processed together with the measured signals that the adjustment of the machine to the workpiece to be machined is effected manually in accordance with the display of a display terminal or automatically through positioning units controlled by the evaluating and processing unit. This woodworking machine is relatively complex in its construction on account of the required computer. Still more complex is the construction when the machine is to be adjusted fully automatically by the computer through positioning units. With manual adjustment the operation is troublesome since the desired length measurement must firstly be keyed in. Only then can the position to be set for the length stop be read off the display of the computer and the length stop be adjusted.

The invention is based on the problem of providing a woodworking machine for end machining frame timbers, especially for window and door frames, of the kind initially referred to, which is of simple construction and simple to operate, facilitates precise machining to measure of the frame timbers and also ensures good support for the frame timber in the vicinity of the end to be machined.

This is achieved according to the invention in that a pivotal bearing containing the vertical pivot axis is arranged above the working region of the circular saw blade and the cutters on a support frame connected to the work table or the machine frame, in that a vertical frame with a cantilevered arm is provided on the graduated fence, the free end of which arm is connected to the pivot axis, and in that the longitudinal side of the table facing the saw plane and extending parallel thereto extends closely up to the saw plane.

Through the arrangement of the pivot bearing above the working region of the circular saw blade and of the cutters and the connection of the graduated fence through a vertical frame with cantilevered arm, the woodworking machine is relatively simple in construction and also facilitate precise machining to measure. The pivot axis of the graduated fence lies precisely at a side surface of the frame timber to be machined at the tip of the mitre to be machined and is also fixed exactly in its position. For this reason the zero point of the millimeter scale, with reference to which the length stop provided on the graduated fence is adjusted, always lies in the extension of the pivot axis and the current millimeter setting of the length stop corresponds to the desired length of the frame timber. The finished machined frame timber then has the length set on the millimeter scale independent of the angular setting of the graduated fence. The operation of the new woodworking machine is thus very simple. Since the graduated fence is pivoted relative to the work table, the longitudinal table side facing the circular saw blade can extend close up to the saw plane. Through this good support of the frame timber up to the immediate vicinity of the end to be machined is ensured in any angular setting of the graduated fence. Very short frame timbers can thus be machined at the ends with the woodworking machine.

An especially advantageous form of the woodworking machine according to the invention consists in that there is provided near the longitudinal table side facing the saw plane above the support surface of the work table a clamp beam for the frame timber, extending parallel to the longitudinal table side and adapted to be raised and lowered. With this clamp beam it is in fact possible to clamp any frame timber to be machined in the immediate vicinity of the end to be machined, independent of the angular setting of the fence bar, without any kind of adjustments having to be made to the clamping device.

BRIEF DESCRIPTION OF THE DRAWINGS

The invention is explained in more detail below, with reference to an embodiment shown in the drawings. These show.

DETAILED DESCRIPTION

On a machine frame 1 there is arranged a work table 2 whose horizontal support surface 3 serves to receive and support the current frame timber 4 to be machined. The work table 2 is fixedly connected to the machine frame 1. On one longitudinal side of the machine frame 1 a carriage 6 is movable in longitudinal guides 5 and carries a saw unit 7 and a moulding unit 8. The saw unit has a circular saw blade 9 rotating about a horizontal axis. The moulding unit 8 has a vertical moulding spindle 10, which carries at least one cutter set 11 at its upper end. The moulding spindle can be movable up and down in the direction of the arrow B if desired and then have a plurality of different cutter sets for cutting different end profiles. A so-called rising spindle is then involved.

On the work table 2 a graduated fence 12 is pivotally mounted about a vertical pivot axis 13 and can be locked in arbitrary angular positions relative to the work table 2 by a locking device, not shown. The graduated fence 12 has a vertical fence surface 12a for the frame timber 4. The pivot axis 13 is arranged near the line of intersection of the saw blade plane S and the vertical plane running through the vertical fence surface 12a. The precise position of the pivot axis 13 will be explained in more detail with reference to FIGS. 4, 5 and 6. The longitudinal table side 2a facing the saw plane S and extending parallel thereto extends close up to the saw plane S.

A pivot bearing 15 is arranged on a support frame 14, which is connected to the work table 2 or if desired also to the machine frame 1, above the working region of the circular saw blade 9 and the working region of the cutters 11. The support frame 14 comprises a support bridge 16 spaced above the work table 2 and which extends parallel to the saw plane S and which is connected to the work table 2 by means of support columns 17 arranged near the ends of the work table 2. A bearing arm 18 projecting towards the saw plane S is connected to the support bridge 16 and carries the pivot bearing 15. The pivot bearing comprises bearing pin 19 engaging in a bearing bore 18a of the bearing arm 18. The bearing bore 18a and the bearing pin 19 together form the pivot axis 13. The free end 20a of a cantilevered arm 20 is connected to the upper end of the bearing pin 19, this arm being for its part a component of a vertical frame 21 which is connected to the graduated fence 12. In this manner the graduated fence 12 is pivotal by means of the pivot bearing 15 about the pivot axis 13 and can be fixed in various arbitrary angular positions relative to the saw plane S.

A length stop 22 for the frame timber 4 is further adjustable on the graduated fence 12 using a millimeter scale 23 and can be held in the set position in known manner. The zero point of the millimeter scale 23 lies in the extension of the pivot axis 13.

In the vicinity of the longitudinal table side 2a facing the saw plane S there is provided a clamp beam 24 for the frame timber 4, above the support surface 3 of the work table 2, extending parallel to the longitudinal table side 2a and adapted to be raised and lowered. Arms 25 are provided at the two ends of the clamp beam 24, on which engage pneumatic clamping cylinders 26. The arms 25 are each fixed to a guide sleeve 27, the sleeves being vertically slidable on the support pillars 17. In this manner the support pillars 17 also serve to guide the clamp beam 24. By actuating the clamping cylinders 26 the clamp beam 24 can be lowered and pressed on to the frame timber in the vicinity of the end of the frame timber 4 to be machined. In this manner the frame timber 4 is clamped fast on the work table 2.

In the illustrated, advantageous embodiment of the woodworking machine the work table 2 is stationary relative to the machine frame 1 and the saw unit 7 as well as the moulding unit 8 are movable relative to the machine frame 1 on the longitudinal guides 5 in the direction C. This implementation has the substantial advantage that the overall length of the machine corresponds only to the length of the work table 2, whereas in the previously known machines with moving work table and stationary saw and moulding units the overall length of the machine is nearly twice the length of the work table. Over and above this the stationary work table has the advantage that the frame timber to be machines is also at rest during the machining, so that the risk of an accident is substantially reduced.

Figure 1:
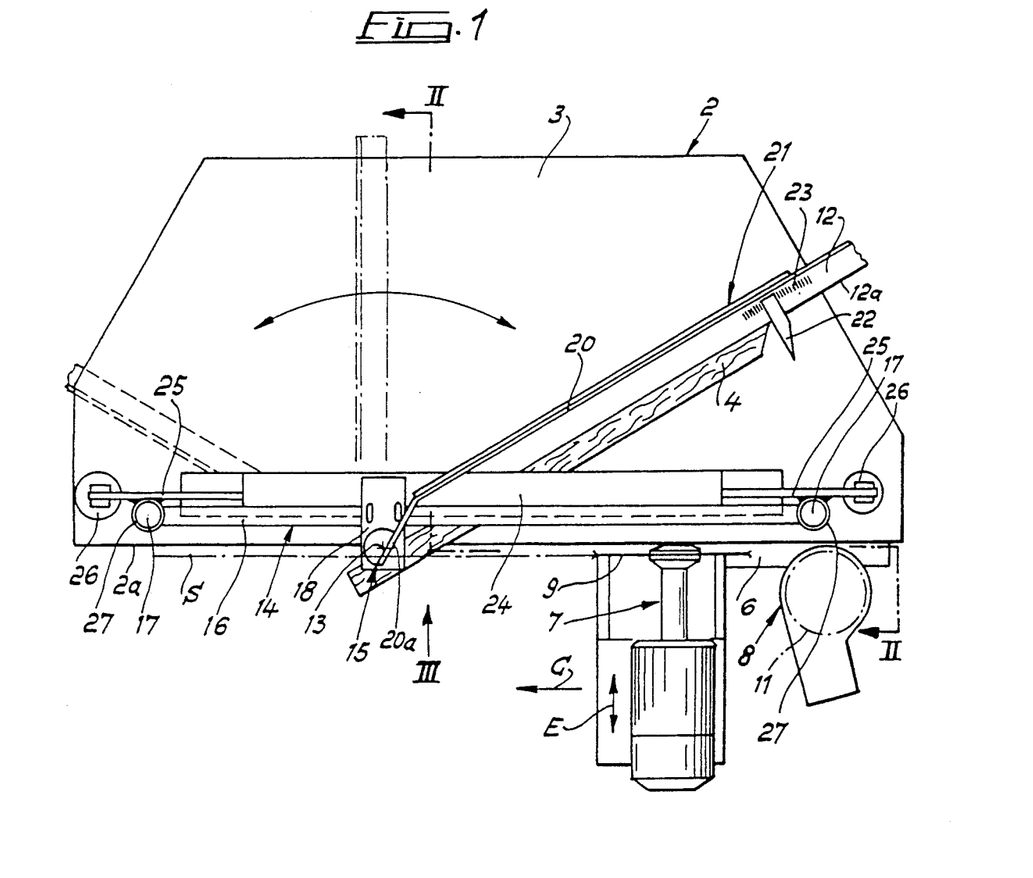
FIG. 1—a plan view of the woodworking machine.
Figure 2:
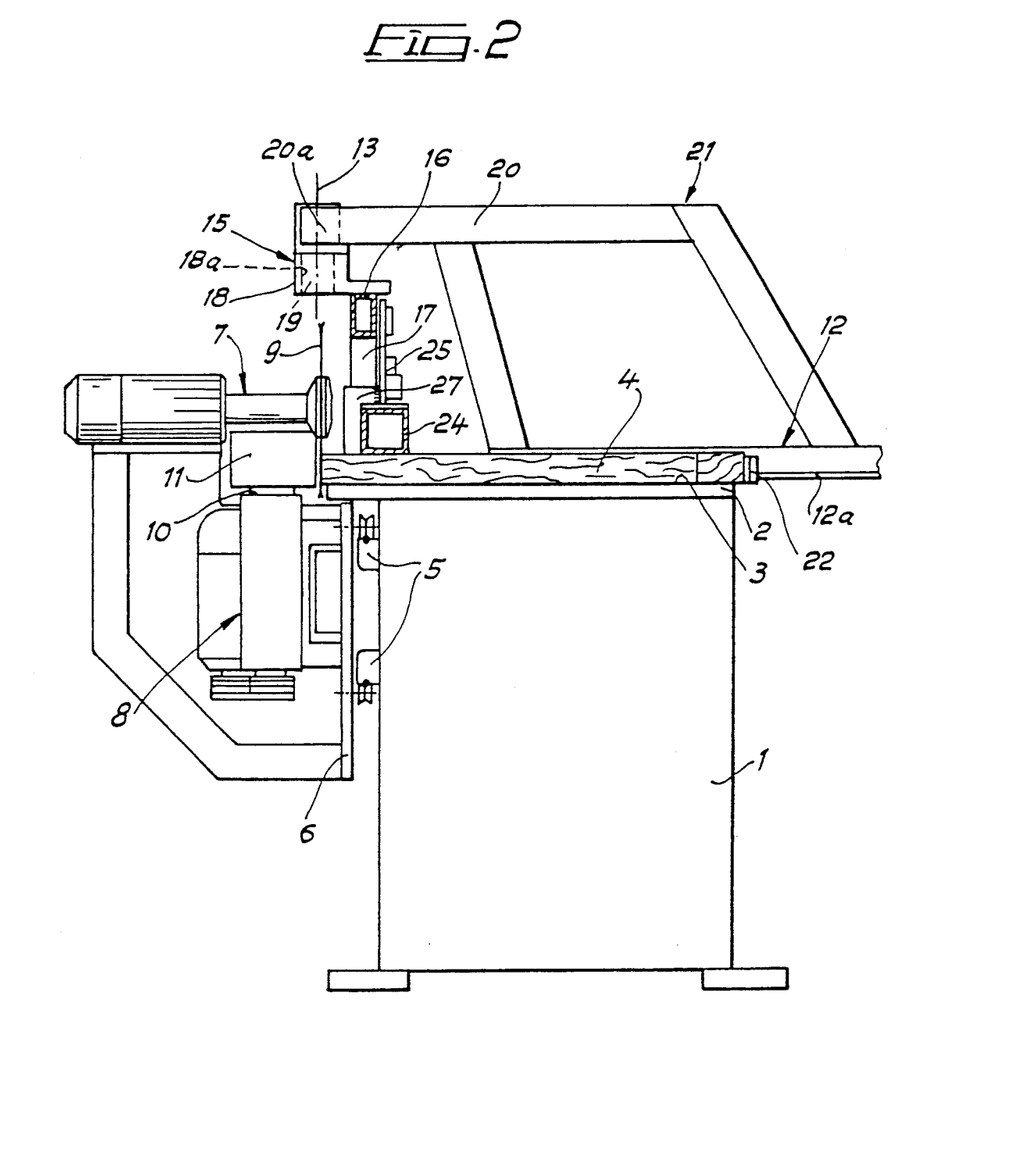
FIG. 2—a cross-section according to the line II—II of FIG. 1, wherein the fence bar assumes the position shown in chain-dotted lines in FIG. 1, FIG. 3—A side view of the woodworking machine, FIGS. 4, 5 and 6—the formation of different moulding tool sets and their respective relationships with the pivot axis in front view, FIGS. 4a, 5a, 6a—the corresponding plan views.
Figure 3:
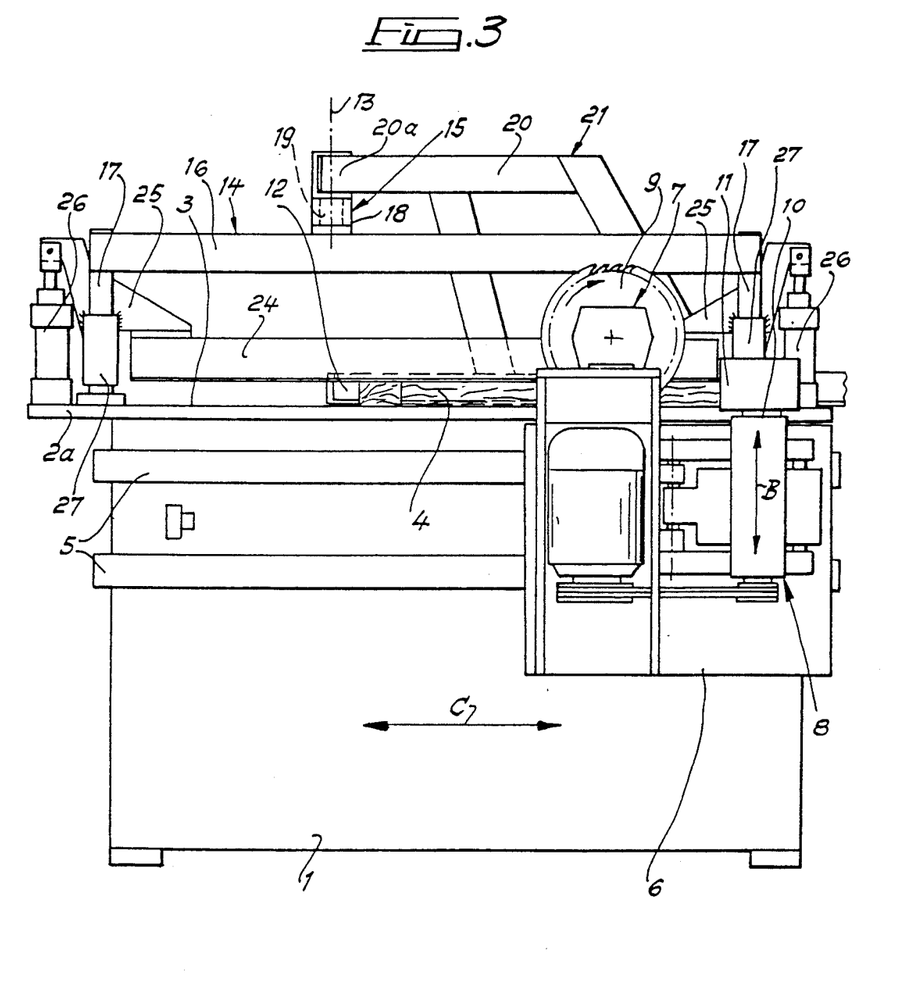

The manner of operation of the above described woodworking machine is as follows:

Firstly the graduated fence 12 is set to the desired angle, which the one end of the frame timber to be machined is to have relative to a longitudinal side of the frame timber, by means of an angle graduation, not shown. The fence bar 12 is clamped fast relative to the work table 2 and the frame timber is placed against the fence surface 12a, without using the length stop 22, so that the end to be machined projects beyond the saw plane S. By actuating the tightening cylinders 26 the clamp beam 24 is pressed down from above on the frame timber 4 and the latter is this held fast. The carriage 6 with the saw unit 7 and the moulding unit 8 is then pushed to the left in FIG. 1 in the direction C, whereby the circular saw blade 9 firstly cuts the frame timber 4 to length and then the cutter set 11 cuts the mini-joint or tongues and grooves or a so-called scribed moulding. The clamp beam 24 is then raised and the frame timber 4 removed from the woodworking machine. If the other end of the frame timber is to be machined at a different angle it is first necessary to bring the graduated fence 12 into the new angular position. Otherwise the graduated fence 12 can stay in the set angular position and the length stop 22 is adjusted by means of the millimeter scale 23 in accordance with the desired external length of the frame timber and is clamped fast. The frame timber is then placed, as is shown in FIG. 1, with the tip of the already machined end against the length stop 22 and against the fence surface 12a and is clamped in the manner described, by means of the clamp beam 24. Machining of the second end then follows in the described manner by the saw unit 7 and the moulding unit 8. In theory the pivot axis 13 could lie on the line of intersection between the vertical plane running through the fence surface 12a and the saw plane S, where the saw plane means that vertical plane which runs through the side of the circular saw blade 9 facing the work table 2. Since however a sawn section is not so smooth as a rule as a moulded surface, it is advantageous to cut the frame timber to length with a certain excess measure, so that even the end surface of the frame timber lying furthest out can then be cut by a moulding cutter. Moreover it is simpler for the measurement and calculation of the length of a frame timber if one works from easily accessible and easily calculable boundary surfaces. Such boundary surfaces are those which run perpendicular to the support surface 3 with the frame timber placed on the work table 2. This will be explained in more detail with reference to FIGS. 4 to 6.

Figure 4:
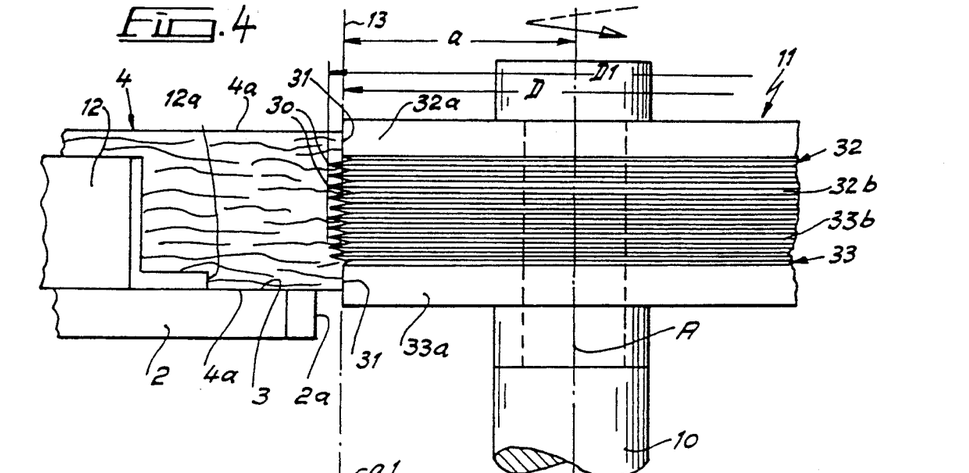

FIG. 4 shows a frame timber 4 which is intended for the manufacture of a segmented arch assembled from a plurality of segments. In such segmented arches the individual straight frame timbers are machined at their ends to the mitre and then glued up into a multi-cornered frame part. In order to increase the surfaces of the parts glued together, the frame timbers must be provided with so-called mini-joints 30 at their ends. These mini-joints are also called finger joints. Sawing off the frame timber to the mitre with the mitre angle $\alpha$ determined by drawing or computation as well as the cutting of the mini-joint profile is effected with the woodworking machine according to the invention. Such mini-joints are so cut as a rule that no grooves are cut near the two side faces 4a of the frame timber but rather flat bounding faces 31, which run precisely in the butt jointing plane between the two adjoining frame timbers. With the frame timber placed on the work table the flat bounding surfaces 31 also run perpendicular to its support surface 3 and slightly spaced parallel from the saw plane S. The pivot axis 13 is arranged precisely on the line of intersection of the vertical plane running through the bounding surfaces 31 and the vertical plane running through the vertical fence surface 12a, as is apparent from FIG. 4a. The length measurement of the finished frame timber is also computed or measured from the butt joint plane which is determined by the bounding surfaces 31, where this length measurement is measured on the longest side of the frame timber as cut on the mitre and moulded, accordingly at the side face 4b of the frame timber bearing on the graduated fence 12 according to FIG. 4a. For this reason it is also important, for the theoretical zero point of the millimeter scale to be arranged precisely at the pivot axis 13, even when the graduated fence 12 ends at some distance from the pivot axis 13, as is apparent from FIGS. 4 and 5.

Figure 4A:
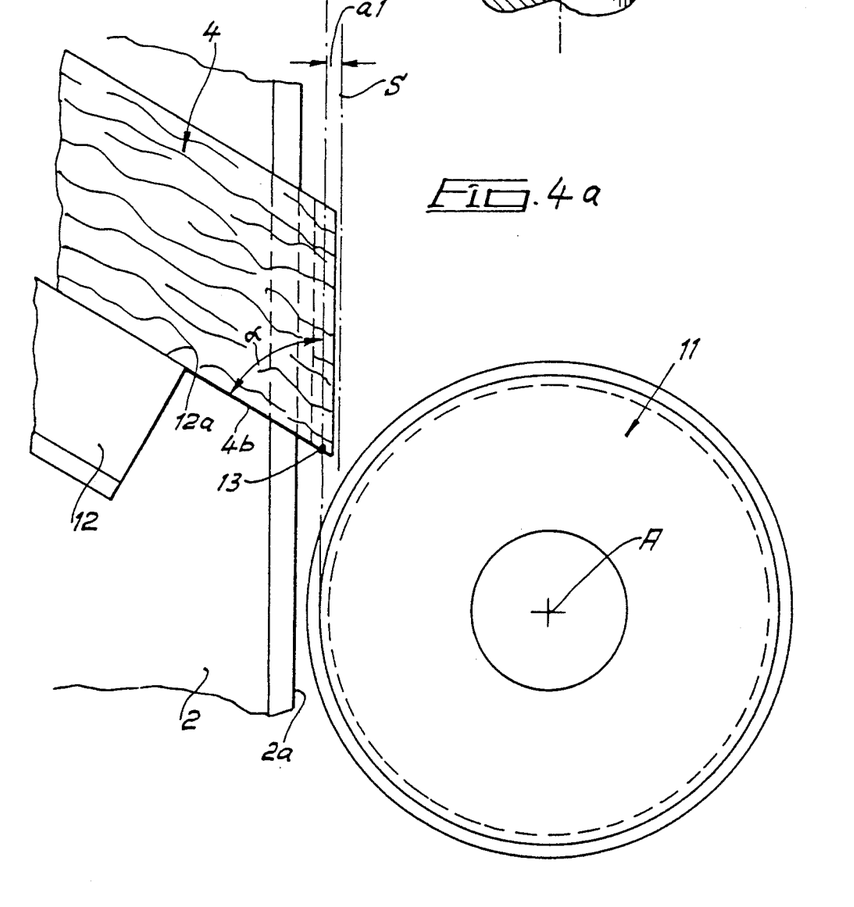

In FIGS. 4 and 4a the moulding spindle 10 with the cutter set 11 arranged thereon is drawn in a position which the moulding spindle 10 assumes when the frame timber 4 has already been cut at the end. Before the moulding cutter reaches the frame timber 4, the frame timber is cut to length, slightly oversize, by the circular saw blade 9 along the saw plane S drawn in chain-dotted lines. Between the saw plane S and the pivot axis 13 there is provided a small spacing a1, which is somewhat larger than half the height of the mini-fingers.

Figures 5, 5A:
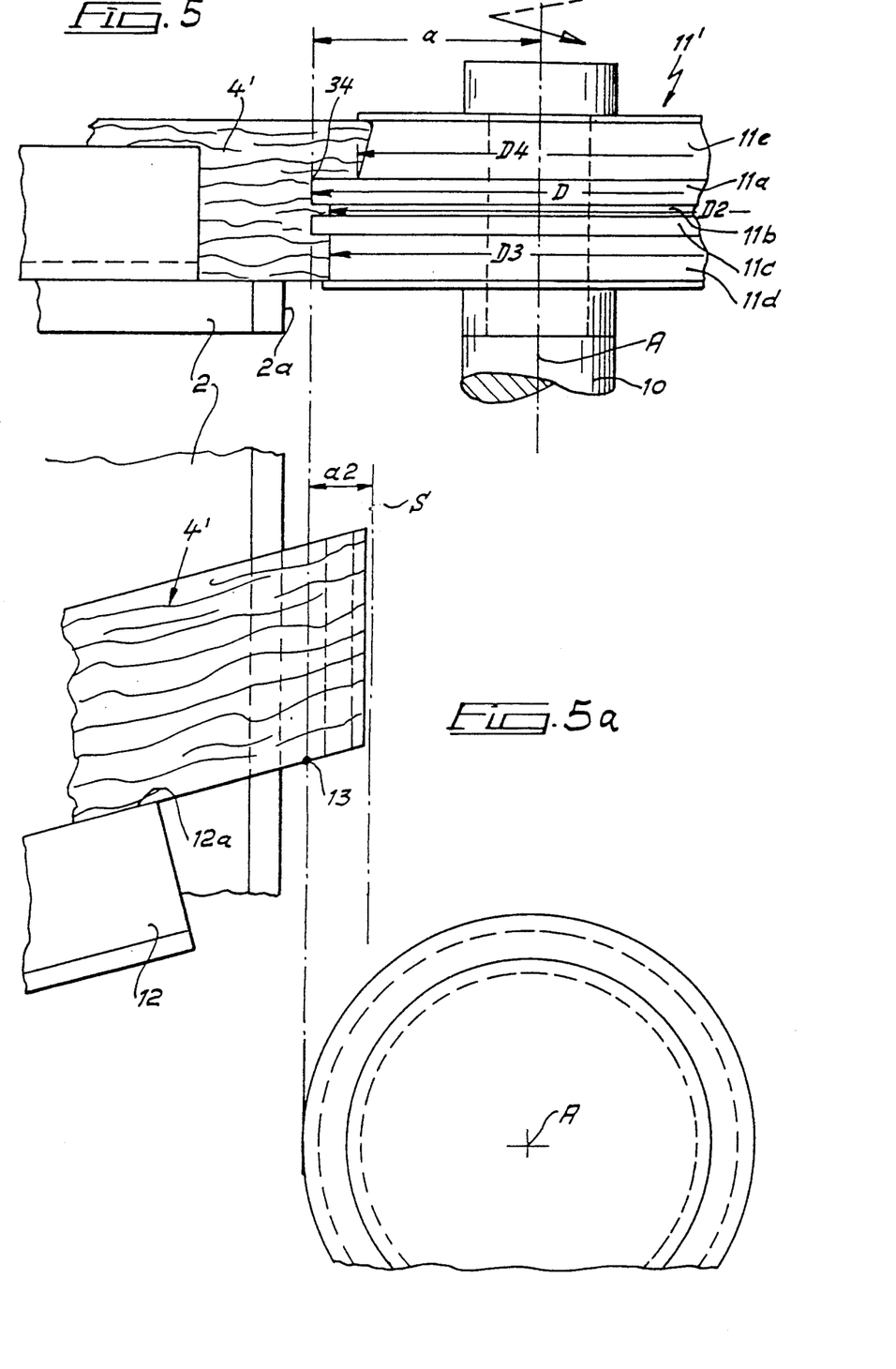
Figures 6, 6A:
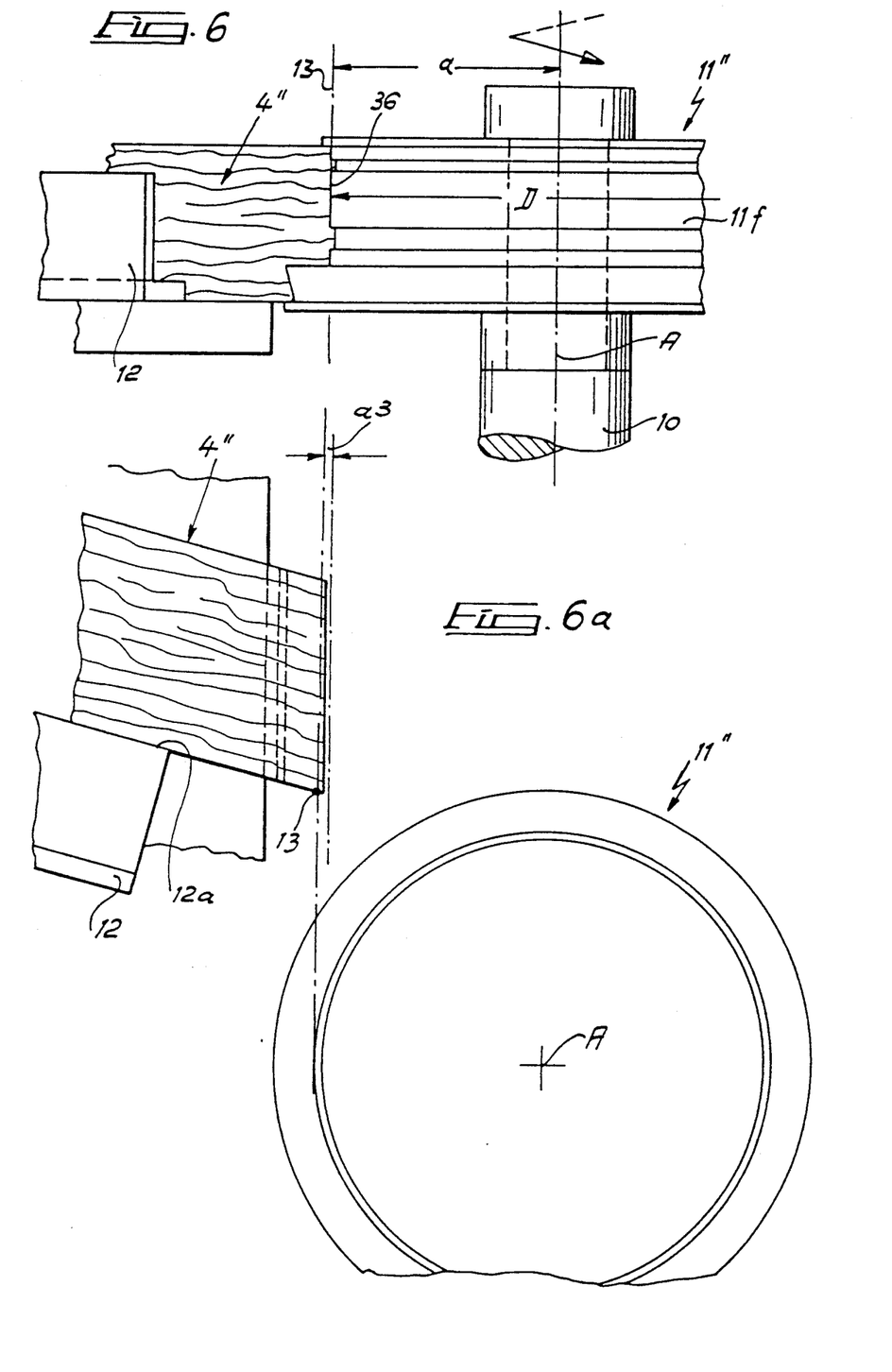

The ends of frame timbers can be provided with any arbitrary profile with the woodworking machine according to the invention. In FIGS. 5 and 6 there are shown two so-called scribed mouldings, as are used in slanted windows. With scribed mouldings the oblique frame timber machined to the mitre is fitted to the longitudinal side of a horizontal or vertical frame timber, where the longitudinal side has the complementary profile. The cutter sets 11' and 11" shown in FIGS. 5 and 6 each have at their periphery a profile which corresponds to the longitudinal profile of the horizontal or vertical frame timber. It would however also be possible to profile the ends of frame timbers with the woodworking machine according to the invention that two adjoining frame timbers fit together with tongues and grooves, as is customary with window and door frames whose frame timbers fit together at right angles.

In order now to be able to cut entirely different profiles at the ends of frame timbers on one and the same woodworking machine, without having to alter the spacing of the moulding spindle axis A from the longitudinal table side 2a, the following dimensioning of the standard cutters or cutter sections is advantageous. Cutter sets 11 which are used to cut mini-joints consists mostly of two cutters 32, 33 which are adjustable axially relative to one another, in order to be able to cut a different number of mini-fingers 30 according to the wood thickness. Those cutters sections 32a, 33a which cut the bounding surfaces 31 perpendicular to the support surface of the work table are designated standard cutter sections. These standard cutter sections 32a, 33a have a specified swept circle diameter or working diameter D. The distance a of the vertical plane of movement in which the moulding spindle axis A moves from the pivot axis 13 corresponds to half the swept circle diameter. The swept circle diameters D1 of the other cutter sections 32a, 33b with which the mini-joints are cut are larger than the swept circle diameter D of the standard cutter sections 32a, 33a by half the height of the mini-fingers. Now, in FIG. 5 there is shown a cutter set 11' which serves to cut a so-called scribed moulding at the end of the frame timber 4'. This cutter set 11' consists of a plurality of individual cutters 11a, 11b, 11c, 11d, 11e. The cutter 11a serves to cut the bounding surface 34 which extends perpendicular to the support surface 3. Since the corresponding surface of the complementary moulding, not shown, is easily accessible and easy to measure, the cutter 11a which cuts the bounding surface 34 is the standard cutter. The swept circle diameter D of this standard cutter 11a is selected to be precisely the same as the swept circle diameter D of the standard cutter section 32a or 33a. In this manner the distance a between the plane of movement of the moulding spindle axis A and the pivot axis 13 can stay constant, in spite of the use of another cutter set 11'. The swept circle diameters D2, D3 and D4 of the other cutters 11b–11e are adapted to the swept circle diameter D of the standard cutter 11a. Since the tongues and grooves in the finished frame timber 4' have greater height differences with this profile to be cut, the spacing a2 of the saw plane S from the fixed pivot axis 13 is somewhat greater than the spacing a1 in the cutting of mini-joints. In order that the saw plane S can be adjusted relative to the pivot axis 13, the saw unit 7 is adjustable in the direction E, i.e. in the direction of the saw axis.

In FIGS. 6 and 6a there is shown another cutter set 11" which serves to cut another scribed moulding on the frame timber 4". In this cutter set 11" the cutter 11f which cuts the bounding surface 36 on the frame timber 4" is selected as the standard cutter. The swept circle diameter D of this standard cutter 11f is the same size as the swept circle diameter D of the cutter section 32a, 33a or of the standard cutter 11a. The swept circle diameters of the other cutters of the cutter set 11" are adapted to the swept circle diameter of the standard cutter 11f. To cut the frame timber 4" off to length the saw unit 7 is so adjusted that the saw plane S runs at a spacing a3 from the pivot axis 13.

The various cutter sets 11, 11', 11" can either be mounted individually as required on the moulding spindle 10 or they can be arranged spaced one above the other on a moulding spindle adapted to be raised and lowered, a so-called rising spindle. In this case the moulding spindle or the whole moulding unit is brought into the currently required height setting by vertical movement in the direction B, so that one of the cutter sets 11, 11', 11" is located at the height of the frame timber currently to be machined.

I claim:

1. In a woodworking machine for end machining of frame timbers, the woodworking machine including a work table, a saw unit with a circular saw blade rotatably supported about a horizontal axis and a moulding unit with a vertical moulding spindle and a plurality of cutters arranged thereon, wherein the two units are movable relative to the work table in the direction of a saw plane, and wherein there is provided a graduated fence pivotal on the work table about a vertical pivot axis and includes means for selectively fixing the position of the fence in a set angular position, wherein the fence has a vertical fence surface for engaging a longitudinal side of the frame timber and a length stop adjustable by means of a millimeter scale, and wherein the pivot axis is arranged adjacent a line of intersection of the saw plane and a vertical plane running through the vertical fence surface, the improvement wherein a pivotal bearing containing the vertical pivot axis is arranged above a working region of the circular saw blade, and wherein the cutters are provided on a support frame connected to at least one of the work table and the machine frame, wherein a vertical frame with a cantilevered arm is provided on the graduated fence, a free end of which arm is connected to the pivot axis, and wherein a longitudinal side of the table facing the saw plane and extending parallel thereto extends closely up to the saw plane.

2. The woodworking machine according to claim 1, wherein the support frame has a support bridge spaced above the work table and which extends parallel to the saw plane and which is connected to the work table by means of support pillars connected thereto adjacent the two ends of the work table.

3. The woodworking machine according to claim 2, wherein a bearing arm which supports the pivot bearing is connected to the support bridge, cantilevered out towards the saw plane.

4. The woodworking machine according to claim 1, wherein a clamp beam for the frame timber, supported for movement between a raised and a lowered position, is provided in the vicinity of the longitudinal table side facing the saw plane, above the support surface of the work table, extending parallel to the longitudinal table side.

5. The woodworking machine according to claim 2, wherein the clamp beam is guided by means of guide sleeves which are vertically slidable on the support pillars.

6. The woodworking machine according to claim 4, wherein two pneumatic clamping cylinders are provided for actuating the clamp beam.

7. The woodworking machine according to claim 1, wherein the work table is stationary relative to the machine frame and the saw unit and the moulding unit are movable relative thereto.

8. The woodworking machine according to claim 1, wherein the sw unit is adjustable relative to the work table in the direction of the saw axis.

9. The woodworking machine according to claim 1, wherein, with a plurality of different cutter sets which cut different profiles at the ends of the frame timbers, the standard cutter sections which cut a bounding surface at an end perpendicular to the support surface of the work table each have the same swept circle diameter as a corresponding one of a standard cutter and a standard cutter section of a different cutter set, wherein the swept circle diameters of other ones of the cutters and the cutter section of each cutter set are adapted to one of the standard cutter and standard cutter section, and wherein the vertical plane of movement in which the moulding spindle axis moves is arranged at a constant distance from the pivot axis, which distance corresponds to half the swept circle diameter of one of the standard cutters and the cutter sections.

* * * * *